United States Patent
Leisi

[11] 3,808,455
[45] Apr. 30, 1974

[54] PRETRIGGERING APPARATUS FOR A SYNCHRONOUS CIRCUIT BREAKER

[75] Inventor: Bruno Leisi, Widen, Switzerland

[73] Assignee: Siemens Aktiengesellschaft, Munchen, Germany

[22] Filed: Nov. 16, 1972

[21] Appl. No.: 307,022

[52] U.S. Cl.......... 307/133, 307/252 UA, 317/11 A
[51] Int. Cl. ............................................. H01h 9/56
[58] Field of Search............ 307/136, 252 UA, 133; 317/11 A

[56] References Cited
UNITED STATES PATENTS

| | | | |
|---|---|---|---|
| 3,700,923 | 10/1972 | Platzer | 307/252 UA X |
| 3,555,354 | 1/1971 | Kotos | 307/136 X |
| 3,530,303 | 9/1970 | Bachofen | 307/133 X |
| 3,378,727 | 4/1968 | Kesselring | 317/11 A |
| 3,215,797 | 11/1965 | Kesselring et al. | 317/11 A |
| 3,206,642 | 9/1965 | Farvis | 317/11 A |
| 3,097,314 | 7/1963 | Harriman | 317/11 A |
| 2,293,296 | 8/1942 | Jonas | 307/136 |

Primary Examiner—Robert K. Schaefer
Assistant Examiner—William J. Smith
Attorney, Agent, or Firm—Kenyon & Kenyon Reilly Carr & Chapin

[57] ABSTRACT

A pretripping apparatus for generating a trigger pulse for initiating the opening of a synchronous circuit breaker to interrupt current ($i_1$) is disclosed. The apparatus includes a measuring circuit arrangement that receives a first voltage ($u_1$) proportional to the current ($i_1$) and a second voltage ($u_2$) proportional to the derivative of the current with respect to time ($di_1/dt$). With these voltages the measuring circuit arrangement measures a time interval $\Delta t_{ox}$ extending from the zero cross-over of the second voltage to a point in time $t_x$ whereat the zero cross-over of the sum of the first voltage and the second voltage occurs, and forms a third voltage corresponding to the time interval. Another circuit receives the third voltage and generates the trigger pulse after a second time interval $\Delta t_{xv}$, the last-mentioned time interval being dependent upon the measured time interval $\Delta t_{ox}$.

3 Claims, 5 Drawing Figures

PRETRIGGERING APPARATUS FOR A SYNCHRONOUS CIRCUIT BREAKER

BACKGROUND OF THE INVENTION

The invention relates to a pretrigger apparatus for synchronous circuit breakers wherein a trigger pulse is derived from the zero crossing of the sum of a first voltage which is proportional to the current to be interrupted and a second voltage which is proportional to the change of the current with respect to time.

In pretrigger apparatus for synchronous circuit breakers it is known to make the trigger pulse dependent on the zero crossing of an auxiliary quantity which is obtained through addition of a first voltage which is proportional to the current to be interrupted, and a second voltage which is proportional to the change of current with time. In the present invention, the time interval from the zero crossing of the second voltage to the zero crossing of the sum of the two voltages is measured and then the trigger pulse is generated after a second time interval which depends on the measured time.

Pretrigger apparatus for synchronous circuit breakers are discussed, for example, in the German Patent 1,173,164 and operate to generate a trigger pulse which initiates the opening of the contact system; this pulse is generated at a time spacing as constant as possible (pretrigger time) prior to the zero crossing of an alternating-current to be interrupted. In a magnetically operated circuit breaker for example, the pretrigger time must be sufficient to build up or collapse a magnetic field which controls the switching movement and to release a latching system that may be present. Thereafter and still within the pretrigger time, the breaker must be opened so far that the arc which is extinguished at the zero crossing is not reestablished.

Previous pretrigger apparatus of the type mentioned above provides a constant lead time only for symmetrical, sinusoidal currents. However, if the current to be interrupted has a direct-current component, the pretrigger time is dependent on the same. The above-mentioned German patent discloses that this can be compensated for by adding a third function to the voltages which are dependent on the current and its change in time; this function which may, for example, be proportional to the second derivative of the current with respect to time. Pretrigger apparatus of this kind, however, is relatively costly.

The above-cited German patent also describes a pretrigger apparatus which operates according to a different principle wherein an auxiliary quantity is used for generating the trigger pulse. This trigger pulse rises linearly from the zero crossing of the current to be interrupted to the next current crest, and falls from the crest to the next zero crossing with an equal slope of opposite sign. The rise of the auxiliary quantity constitutes here a kind of time measurement by which the duration of the half-wave can be determined also for asymmetrical currents. However, disturbances of the current waveform which occur within the half-wave can make this measurement erroneous so that faulty switching results.

SUMMARY OF THE INVENTION

It is an object of the invention to provide a pretriggering apparatus of the type mentioned above wherein a time measurement of the current is performed which makes it possible to determine the next zero crossing of the current. Subsidiary to this object, it is an object of the invention to provide such an apparatus wherein the zero crossing is determined when the current is asymmetrical and wherein the time interval in which disturbances can lead to an erroneous prediction of the next zero crossing, is substantially shorter than with the known time measurement.

The pretriggering apparatus of the invention can be used with synchronous circuit breakers used for interrupting a current $i_1$. According to a feature of the apparatus, supply means are provided for supplying a first voltage ($u_1$) proportional to the current ($i_1$) and a second voltage ($u_2$) proportional to the derivative of the current with respect to time ($di_1/dt$). Measuring means are connected to the supply means to receive the first and second voltages for measuring a time interval $\Delta t_{ox}$ extending from the zero cross-over of the second voltage to a point in time $t_x$ whereat the zero cross-over of the sum of the first voltage and the second voltage occurs and for forming a third voltage corresponding to the time interval. The apparatus also includes circuit means connected to the measuring means and to receive the third voltage for generating the trigger pulse after a second time interval $\Delta t_{xv}$, the second time interval being dependent upon the measured time interval $\Delta t_{ox}$.

Thus, the objects of the invention are realized by providing means to measure a first time interval from the zero crossing of the second voltage to the time of the zero crossing of the sum of both voltages, and then to generate the trigger pulse after a second time interval which is dependent on the measured time. The time interval which is required for predicting the next zero crossing starts here only at the time of the maximum of the current to be interrupted, so that the probability of disturbances is reduced at least to one-half, as compared with the pretrigger equipment according to the German Patent 1,173,164 referred to above.

According to another feature of the invention, the circuit means can include subsidiary circuit means to receive the third voltage for forming a measuring voltage $u_3$ having a rise portion rising linearly for the duration of the time interval $\Delta t_{ox}$, said measuring voltage also having a fall portion falling approximately linearly and commencing at time $t_x$. Also provided are monitoring circuit means connected to the subsidiary circuit means for monitoring the measuring voltage $u_3$ and for generating the trigger pulse when the measuring voltage drops below a predetermined value.

Of particular importance here is the determination of the magnitude ratios of the two voltages mentioned, as well as the ratio of the rise to the fall velocity of the measuring voltage. The best results are obtained, for example, for a pretrigger time of 1.5 ms if the two voltages are chosen equal and and the fall velocity of the measuring voltage is made 1.3 to 1.4 times larger than its rise velocity. For a pretrigger time of 3.0 ms, however, it is advantageous to make the second voltage 4 times larger than the first voltage and to choose the rise velocity of the measuring voltage about 2.6 times larger than its fall velocity. These measures contribute particularly to a pretrigger time which is independent of the duration of the half-wave and is practically constant.

As another embodiment, the apparatus of the invention can be realized by using digital techniques. An oscillator as well as switching means are then provided to operate the apparatus during the first time interval with a predetermined first frequency and subsequently, after the point in time $t_x$, with a predetermined second frequency. A counting circuit then counts the oscillations of the oscillator during the first time interval and subsequently, after the point in time $t_x$, reduces the amount counted continuously by each oscillation of the oscillator which now operates at the second frequency. A trigger pulse is generated when the count falls below a predetermined value.

According to a further embodiment, voltages are preferably taken off at the means provided for the measurement of the current to be interrupted, and means supplied by these voltages are provided which place a release circuit in the conduction state for a value of the current which is too small for synchronous release, or for the current zero, so that in the event of a release command arriving from the outside, the trigger pulse is generated just the same.

Although the invention is illustrated and described herein as a pretriggering apparatus for a synchronous circuit breaker, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS OF THE INVENTION

Figure 1:
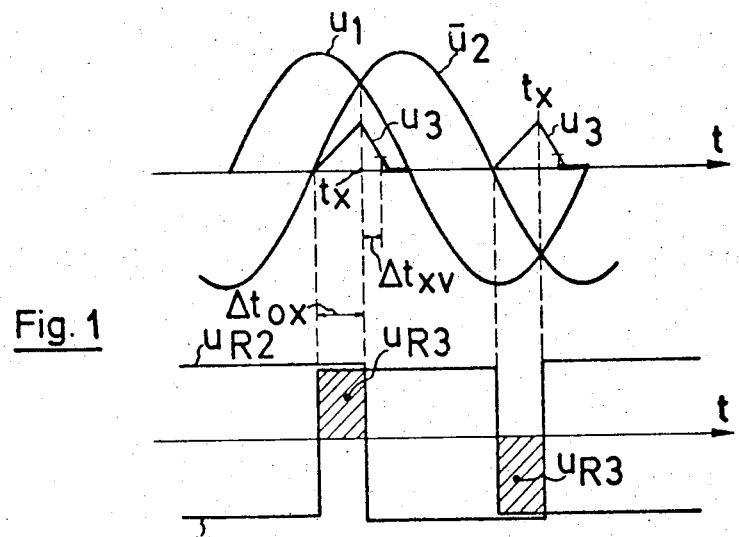
FIGS. 1 and 2 show waveforms representing the voltages supplied to the pretriggering apparatus according to the invention. Also shown, are waveforms of voltages occurring at selected circuit locations within the apparatus.
Figure 2:
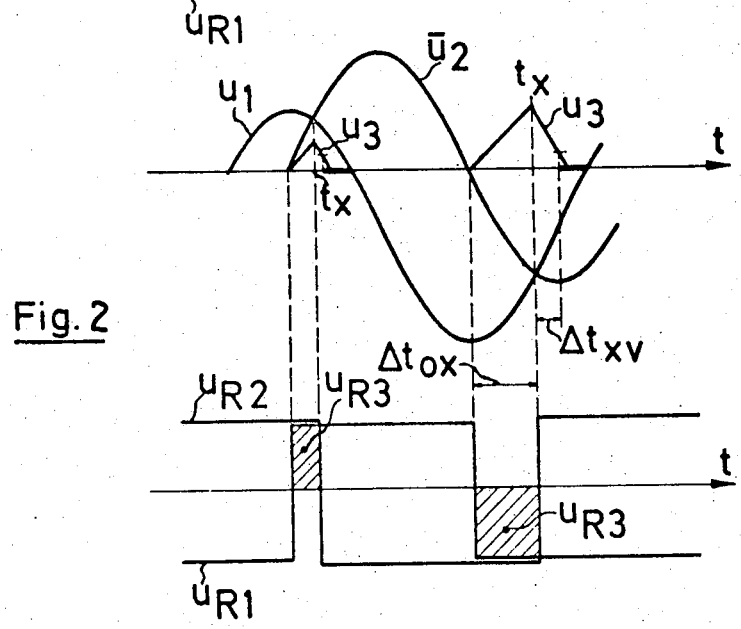
Figure 3:
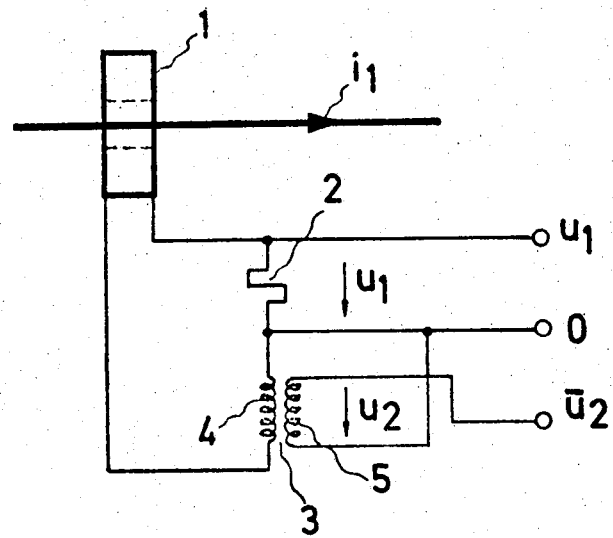
FIG. 3 is a schematic diagram of a circuit for obtaining the voltages supplied to the triggering apparatus.

In FIGS. 1 to 5, the symbol $u_1$ denotes the voltage which is proportional to the current to be interrupted ($i_1$ in FIG. 3). The symbol $\bar{u}_2$ designates the curve of the inverted voltage $u_2$, the voltage $\bar{u}_2$ being shifted in phase relative to $u_2$. The voltage $u_2$ is proportional to the change in current $i_1$ with respect to time over the entire current range. With $t_x$ is denoted the point in time where the curve of the voltage $u_1$ and the curve of the voltage $\bar{u}_2$ intersect; this corresponds to the zero crossing of the sum $u_1 + u_2$.

For a pretrigger time of 1.5 ms the amplitudes of the voltages $u_1$ and $\bar{u}_2$ are essentially equal according to FIGS. 1 and 2. FIG. 1 shows the waveform of these voltages and of auxiliary voltages corresponding to a symmetrical current $i_1$, the auxiliary voltages being described below. FIG. 2 illustrates the same for an asymmetrical current waveform where the voltage $u_1$ represents here also the waveform of the current $i_1$ to be interrupted. In all cases, a first time interval $\Delta t_{ox}$ from the zero crossing of the inverted phase-shifted voltage $\bar{u}_2$ to the point in time $t_x$ is measured, and the trigger pulse is generated after a second time interval $\Delta t_{xv}$ which is dependent upon the measured time.

According to FIGS. 1 and 2, a measuring voltage $u_3$ is generated which rises linearly during the first time interval $\Delta t_{ox}$ and then, after the point in time $t_x$, falls again linearly during the second time interval $\Delta t_{xv}$. The trigger pulse is generated when the measuring voltage $u_3$ falls below a predetermined value. When a pretrigger time of 1.5 ms is required, the fall velocity of the measuring voltage $u_3$ is set preferably 1.3 to 1.4 times greater than the rise velocity. FIGS. 1 and 2 indicate that this provides a pretrigger time which is practically independent of the duration of the half-wave (heavily drawn section of the time axis $t$).

The generation of the above-mentioned measuring voltage $u_3$ will be seen from the lower portions of FIGS. 1 and 2. A voltage $u_{R3}$ of rectangular waveform (drawn hatched) having a duration of the time interval $\Delta t_{ox}$ is generated by forming the mean value of the rectangular-wave voltages $u_{R1}$ and $u_{R2}$. Here, $u_{R1}$ is the output signal of an amplifier driven with the voltage $\bar{u}_2$ and $u_{R2}$ is the output signal of a differential amplifier driven with the difference of the voltages $u_1 - \bar{u}_2$. Known integrated amplifiers with high gain are suitable for this purpose, so that an unambiguous rectangular-wave signal $u_{R3}$ and the measuring voltage $u_3$ derived therefrom can be generated in the entire current range down to a fraction of the nominal current. The measuring voltage $u_3$ can be taken from an integrating amplifier which causes a linear rise for the duration of the rectangular-wave voltage $u_{R3}$ and, at $u_{R3} = 0$, a linear decay of the measuring voltage $u_3$. The measuring voltage waveform need, however, not be linearized exactly. The voltage at a capacitor, for example, which is charged and discharged via resistors by the rectangular-wave voltage $u_{R3}$ is satisfactory.

Figure 4:
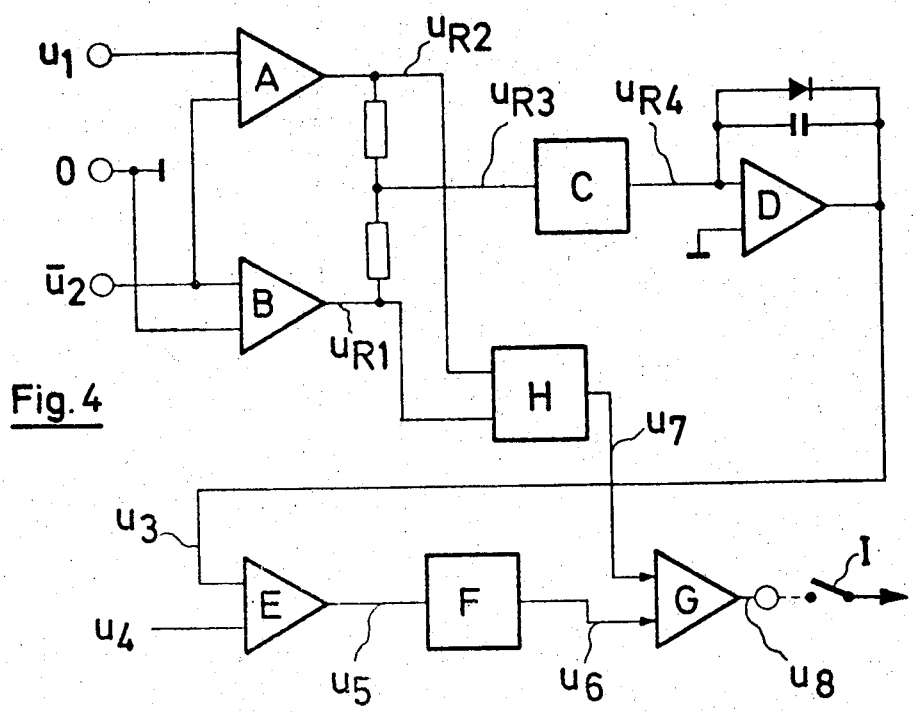
FIG. 4 is a circuit diagram of the pretriggering apparatus according to the invention.
Figure 5:
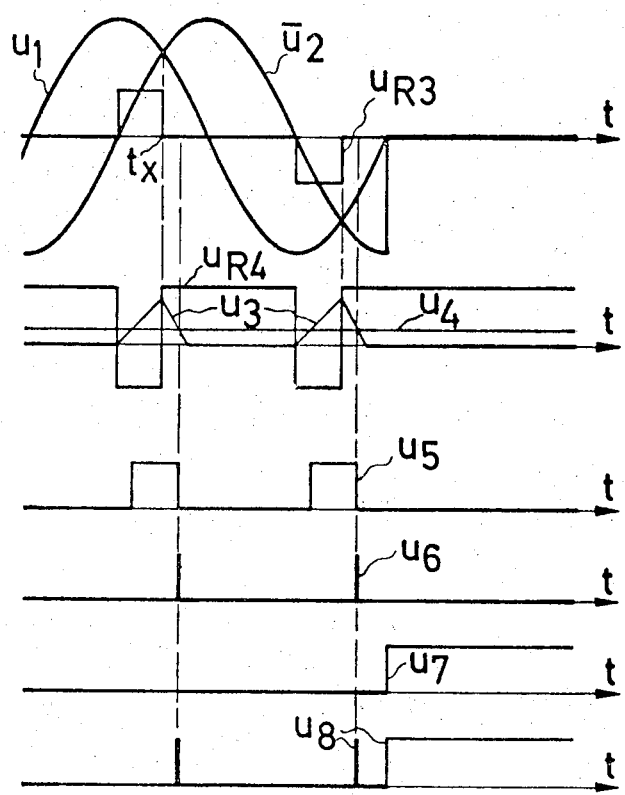
FIG. 5 shows additional waveforms of voltage occurring in the pretriggering apparatus.

FIG. 4 shows a block circuit diagram of a pretrigger apparatus which operates in accordance with the waveform of FIGS. 1 and 2. The operation of the apparatus will be understood from the following explanations and with reference also to FIGS. 4 and 5. The individual blocks in FIG. 4 are:

A, the above-mentioned differential amplifier which generates $u_{R2}$;

B, the amplifier discussed above which converts $\bar{u}_2$ into $u_{R1}$;

C, a signal shaper which converts the rectangular-wave voltage $u_{R3}$ into an in-phase rectangular-wave voltage $u_{R4}$, the magnitude of $u_{R4}$ determining the rise and fall velocity of the measuring voltage $u_3$;

D, the intergrating amplifier with capacitor and shunt-connected diode in the negative feedback circuit for generating the measuring voltage $u_3$;

E, a threshold monitoring circuit which generates a steeply declining voltage $u_5$ when the measuring voltage $u_3$ falls below a predetermined voltage value $u_4$;

F, a pulse shaper which generates a voltage pulse $u_6$ of the desired duration of the release pulse $u_8$ when the voltage $u_5$ drops;

G, an amplifier which amplifies the voltage pulse $u_6$ and/or a voltage $u_7$ yet to be described to the level of the desired release pulse $u_8$;

H, a threshold monitoring circuit which monitors the rectangular-wave voltages $u_{R1}$ and $u_{R2}$ to ascertain a value of the current $i_1$ which is too small for synchronous control; if both square-wave voltages $u_{R1}$ and $u_{R2}$ have too small an absolute value or insufficient rectangular shape simultaneously, the circuit H generates a voltage $u_7$ which generates via the amplifier G the release pulse $u_8$ in the event of an interrupt command arriving from the outside; and, I, a switch which is closed by a command coming from the outside and connects the pretrigger apparatus with the release circuit of the synchronous circuit breaker and, in this way, the next release pulse generated by the pretrigger apparatus causes the synchronous circuit breaker to open to interrupt the current $i_1$.

The circuit diagram of FIG. 4 shows an embodiment of the pretriggering apparatus in which the measurement of the two time intervals $\Delta t_{ox}$ and $\Delta t_{xv}$ is based on analog measuring technology. These time measurements can, however, also be made in accordance with digital measuring techniques.

Digital equipment (not shown) can, for example, comprise an oscillator, a counting circuit as well as switching means to operate the oscillator during the first time interval $\Delta t_{ox}$ with a predetermined first frequency and subsequently, after the point in time $t_x$, with a second frequency which, for a pretrigger time of 1.5 ms. is preferably 1.3 to 1.4 times higher. During the first time interval $\Delta t_{ox}$, the counting circuit counts the oscillations of the oscillator from zero to $x$, in order to reduce, after the point in time $t_x$, the counted amount by each oscillation of the oscillator which now operates at the second frequency. The trigger pulse is generated during this return-counting when the counter content falls below a predetermined value.

With the analog as well as with the digital techniques, no trigger signal is transmitted if the duration of the half-wave of the current $i_1$ is too short due to excessive asymmetry, that is, if during the time interval $\Delta t_{ox}$ the measurement or count value, below which the count must fall to trigger, was not exceeded. In this case, the circuit breaker is released, as desired, only in the next half-wave of the current $i_1$.

In FIG. 3, means for obtaining the voltages $u_1$ and $\bar{u}_2$ are shown. The current to be interrupted $i_1$ excites a line current transformer 1. The secondary current of this transformer flows through a resistor (shunt) 2 and the primary winding 4 of an air core transformer 3 (I-transformer), at whose secondary winding 5 the phase-shifted voltage $u_2$ is obtained. By reversing the leads at winding 5, the inverted voltage $\bar{u}_2$ is obtained and the voltage $u_1$ is taken off at the resistor 2. So that the last-mentioned voltage $u_1$, is, as accurately as possible, in phase with the current $i_1$, it is advantageous to use a line current transformer with a very small air gap (anti-remanence transformer). Instead of the air-core transformer 3, an air gap transformer partially equipped with iron can also be used, if its secondary voltage is a sufficiently accurate image of the rate of change of the current $i_1$ over the entire current range. The resistor 2 and the transformer 3 can be made small because the electronic circuit arrangement connected thereto loads these parts with at most a few milliwatts.

Instead of the arrangement shown in FIG. 3, it is also possible to arrange the shunt and the I-transformer in the circuit breaker itself at high-voltage potential and to let the current $i_1$ supply them. In this case the pretrigger apparatus is also at high-voltage potential and its current supply is provided according to known techniques. To avoid the effects of magnetic interference, it may in some cases be advisable to shield the I-transformer 3 magnetically or to replace it by an electronic phase shifter circuit.

To be able to generate the trigger pulse also for a current $i_1$ which is too small for synchronous triggering, or for zero current, a circuit is provided which monitors the current $i_1$. According to the embodiment as per FIG. 4, the circuit H can also be provided which monitors the square-wave voltages $u_{R1}$ and $u_{R2}$. If the current $i_1$ and/or the square-wave voltages $u_{R1}$ and $u_{R2}$ derived therefrom become too small, the threshold monitor unit H preferably causes, via the amplifier G, the synchronous circuit breaker to open in the event of a release command (closing of the switch I) coming from the outside.

What is claimed is:

1. In a synchronous circuit breaker for interrupting a current $i_1$, a pretripping apparatus for generating a trigger pulse for initiating the opening of the breaker comprising supply means for providing a first voltage ($u_1$) proportional to the current ($i_1$) and a second voltage ($u_2$) proportional to the derivative of the current with respect to time ($di_2/dt$); measuring means connected to said supply means to receive said first and second voltages for measuring a time interval $\Delta t_{ox}$ extending from the zero cross-over of said second voltage to a point in time $t_x$ whereat the zero cross-over of the sum of said first voltage and said second voltage occurs and for forming a third voltage corresponding to said time interval; and circuit means connected to said measuring means and receiving said third voltage for generating the trigger pulse after a second time interval $\Delta t_{xv}$, said second time interval being dependent upon said measured time interval $\Delta t_{ox}$.

2. The pretripping apparatus of claim 1, said circuit means including subsidiary circuit means receiving said third voltage for forming a measuring voltage $u_3$ having a rise portion rising linearly for the duration of said time interval $\Delta t_{ox}$, said measuring voltage also having a fall portion falling approximately linearly and commencing at said time $t_x$; and, monitoring circuit means connected to said subsidiary circuit means for monitoring said measuring voltage $u_3$ and for generating the trigger pulse when said measuring voltage drops below a predetermined value.

3. The pretripping apparatus of claim 1, wherein the circuit breaker has a release circuit for opening the breaker, said measuring means including first amplifier means for forming a voltage $u_{R2}$ from the quantity ($u_1-\bar{u}_2$), and second amplifier means for forming the voltage $u_{R1}$ from the quantity $\bar{u}_2$, said apparatus further comprising a switch closeable by a command signal from outside of the apparatus whereby the apparatus is connected to the release circuit of the breaker, threshold monitoring means connected to said switch and monitoring said voltages $u_{R1}$ and $u_{R2}$ for initiating a trigger pulse to open the circuit breaker when said voltages $u_{R1}$ and $u_{R2}$ become too small for synchronous triggering and when said command signal is supplied to said switch.

* * * * *

UNITED STATES PATENT OFFICE
CERTIFICATE OF CORRECTION

Patent No. 3,808,455    Dated April 30, 1974

Inventor(s) Bruno Leisi

It is certified that error appears in the above-identified patent and that said Letters Patent are hereby corrected as shown below:

The Foreign Application Priority Data was not mentioned

--Nov. 22, 1971   Switzerland..........017046/71--

In column 1, line 53, change "This trigger pulse" to
--This auxiliary quantity--

In column 6, line 26, change "time $(di_2/dt)$" to
--time $(di_1/dt)$--

Signed and sealed this 3rd day of December 1974.

(SEAL)
Attest:

McCOY M. GIBSON JR.
Attesting Officer

C. MARSHALL DANN
Commissioner of Patents